United States Patent
Lee et al.

(10) Patent No.: US 10,383,155 B2
(45) Date of Patent: Aug. 13, 2019

(54) METHOD AND APPARATUS FOR PERFORMING SIDELINK TRANSMISSION BASED ON CONTENTION BASED SCHEDULING REQUEST IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/571,152

(22) PCT Filed: May 9, 2016

(86) PCT No.: PCT/KR2016/004825
§ 371 (c)(1),
(2) Date: Nov. 1, 2017

(87) PCT Pub. No.: WO2016/178552
PCT Pub. Date: Nov. 10, 2016

(65) Prior Publication Data
US 2018/0263062 A1 Sep. 13, 2018

Related U.S. Application Data

(60) Provisional application No. 62/157,988, filed on May 7, 2015.

(51) Int. Cl.
*H04W 74/08* (2009.01)
*H04W 72/12* (2009.01)
(Continued)

(52) U.S. Cl.
CPC ... *H04W 74/0891* (2013.01); *H04W 72/1284* (2013.01); *H04W 74/08* (2013.01);
(Continued)

(58) Field of Classification Search
CPC . H04W 74/0891; H04W 76/14; H04W 72/02; H04W 72/14
See application file for complete search history.

(56) References Cited

U.S. PATENT DOCUMENTS

2012/0213183 A1* 8/2012 Chen ............... H04W 72/1278
370/329
2014/0293898 A1* 10/2014 Tseng ............... H04W 24/02
370/329
(Continued)

OTHER PUBLICATIONS

Panasonic, "SL-DCH transmission for the autonomous resource allocation mode," R2-151158, 3GPP TSG RAN WG2 Meeting #89bis, Apr. 10, 2015, see section 5.14.1.1.
(Continued)

*Primary Examiner* — Lakeram Jangbahadur
(74) *Attorney, Agent, or Firm* — Dentons US LLP

(57) ABSTRACT

A method and apparatus for performing a sidelink (SL) transmission in a wireless communication system is provided. A user equipment (UE) transmits a contention based scheduling request (CB-SR) to an eNodeB (eNB) by using CB-SR resources to request SL transmission resources, and determines whether a SL grant for the SL transmission resources is received or not. If the UE does not receive the SL grant until a timer expires, the UE may transmit non-contention based SR to the eNB or autonomously select SL resources from resource pool to perform SL transmission.

6 Claims, 9 Drawing Sheets

(51) Int. Cl.
  *H04W 76/14*     (2018.01)
  *H04W 72/02*     (2009.01)
  *H04W 72/14*     (2009.01)

(52) U.S. Cl.
  CPC ........ *H04W 72/02* (2013.01); *H04W 72/1289* (2013.01); *H04W 72/14* (2013.01); *H04W 76/14* (2018.02)

(56) References Cited

U.S. PATENT DOCUMENTS

| | | | | |
|---|---|---|---|---|
| 2014/0314039 | A1* | 10/2014 | Jang | H04L 5/003 370/329 |
| 2016/0128094 | A1* | 5/2016 | Lee | H04W 72/14 370/329 |
| 2018/0139724 | A1* | 5/2018 | Loehr | H04W 72/02 |

OTHER PUBLICATIONS

3GPP TS 36.321 V12.5.0, "3GPP; TSG RAN; E-UTRA; MAC protocol specification (Release 12)," Mar. 27, 2015, see pp. 31, 40, 41.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12)", 3GPP TS 36.300 V125.0 (Mar. 24, 2015), XP050928064.

Huawei, HiSilicon, "Issues of Contention Resolution for ProSe", 3GPP TSG-RAN WG2 Meeting #89, Feb. 9-13, 2015, R2-150298.

LG Electronics, "Issues on Scheduling Request for D2D Communication", 3GPP TSG-RAN WG2 #87, Aug. 18-22, 2014, R2-143543.

ASUSTeK, "Issue on resource allocation for ProSe-BSR", 3GPP TSG-RAN WG2 Meeting #87, Aug. 18-22, 2014, R2-143548.

Change Request: Ericsson, "Introduction of ProSe", 3GPP TSG-RAN WG2 Meeting #87, Oct. 6-10, 2014, R2-144473.

* cited by examiner

METHOD AND APPARATUS FOR PERFORMING SIDELINK TRANSMISSION BASED ON CONTENTION BASED SCHEDULING REQUEST IN WIRELESS COMMUNICATION SYSTEM

CROSS-REFERENCE TO RELATED APPLICATIONS

This application is the National Stage filing under 35 U.S.C. 371 of International Application No. PCT/KR2016/004825, filed on May 9, 2016, which claims the benefit of U.S. Provisional Application No. 62/157,988 filed on May 7, 2015, the contents of which are all hereby incorporated by reference herein in their entirety.

BACKGROUND OF THE INVENTION

Field of the Invention

The present invention relates to wireless communications, and more particularly, to a method and apparatus for performing a sidelink transmission based on a contention based scheduling request (CB-SR) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation. Better latency than previous generations of 3GPP radio access technologies (RATs) was one performance metric that guided the design of LTE. LTE is also now recognized by the end-users to be a system that provides faster access to internet and lower data latencies than previous generations of mobile radio technologies. In the 3GPP, much effort has been put into increasing data rates from the first release of LTE (Rel-8) until the most recent one (Rel-12). However, with regard to further improvements specifically targeting the delays in the system little has been done.

Packet data latency is important not only for the perceived responsiveness of the system, but it is also a parameter that indirectly influences the throughput. In addition, to achieve really high bit rates, UE L2 buffers need to be dimensioned correspondingly. The longer the round trip time (RTT) is, the bigger the buffers need to be. The only way to reduce buffering requirements in the UE and eNB side is to reduce latency. Further, radio resource efficiency could also be positively impacted by latency reductions. Lower packet data latency could increase the number of transmission attempts possible within a certain delay bound, hence higher block error rate (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. voice over LTE (VoLTE)), if keeping the same BLER target. This may improve the VoLTE voice system capacity.

Various pre-scheduling strategies can be used to lower the latency to some extent, but similarly to shorter scheduling request (SR) interval introduced in Rel-9, they do not necessarily address all efficiency aspects. Accordingly, various techniques to reduce latency, e.g. reduced transmission time (TTI) and processing time, contention based physical uplink shared channel (CB-PUSCH) transmission, etc., have been discussed.

SUMMARY OF THE INVENTION

The present invention provides a method and apparatus for performing a sidelink transmission based on a contention based scheduling request (CB-SR) in a wireless communication system. The present invention provides a method and apparatus for using CB-SR resources to request sidelink transmission resources.

In an aspect, a method for performing, a user equipment (UE), a sidelink (SL) transmission in a wireless communication system is provided. The method includes transmitting a contention based scheduling request (CB-SR) to an eNodeB (eNB) by using CB-SR resources to request SL transmission resources, and determining whether a SL grant for the SL transmission resources is received or not.

In another aspect, a user equipment (UE) in a wireless communication system is provided. The UE includes a memory, a transceiver, and a processor coupled to the memory and the transceiver. The processor is configured to control the transceiver to transmit a contention based scheduling request (CB-SR) to an eNodeB (eNB) by using CB-SR resources to request sidelink (SL) transmission resources, and determine whether a SL grant for the SL transmission resources is received or not.

Sidelink transmission can be performed with short latency.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
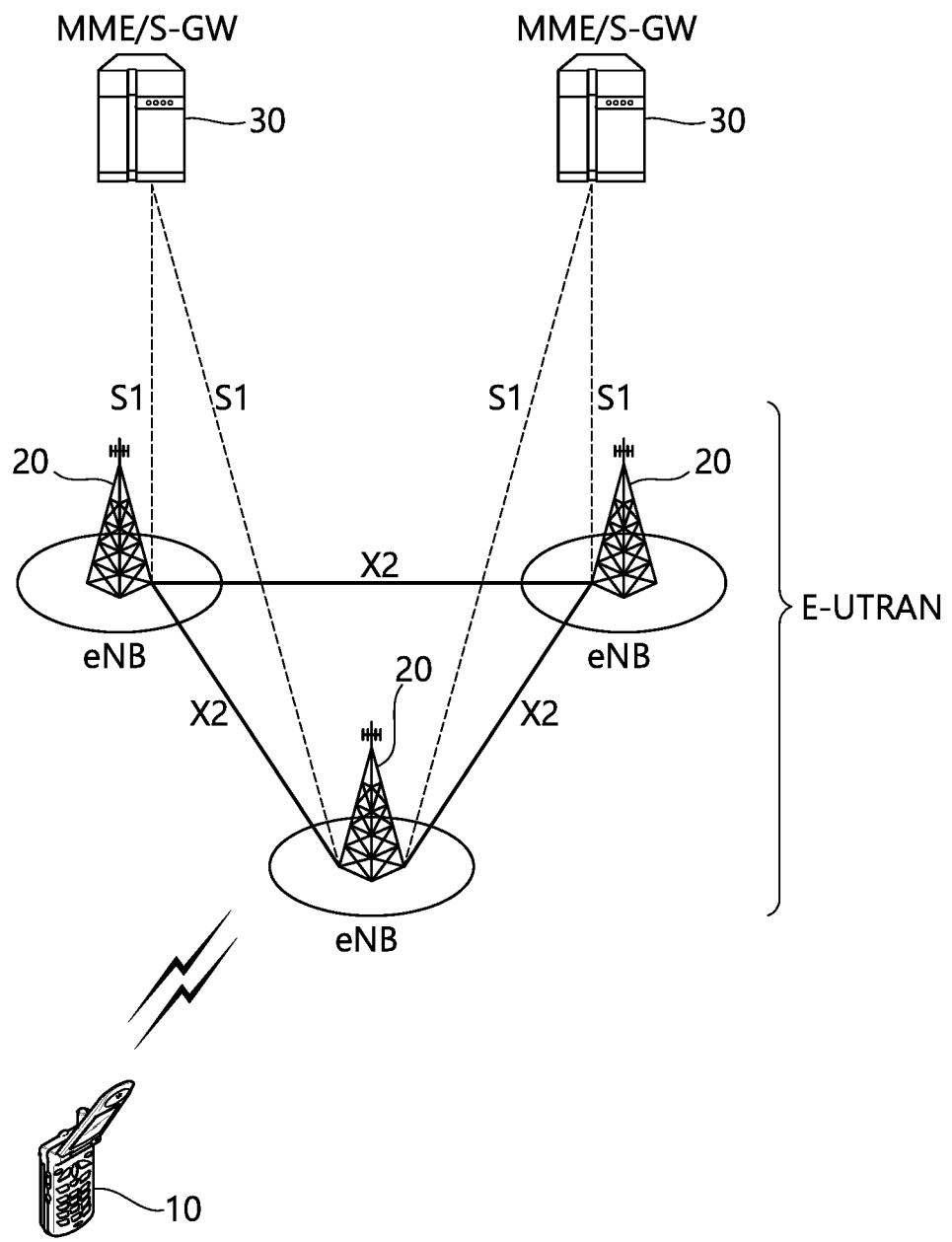
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
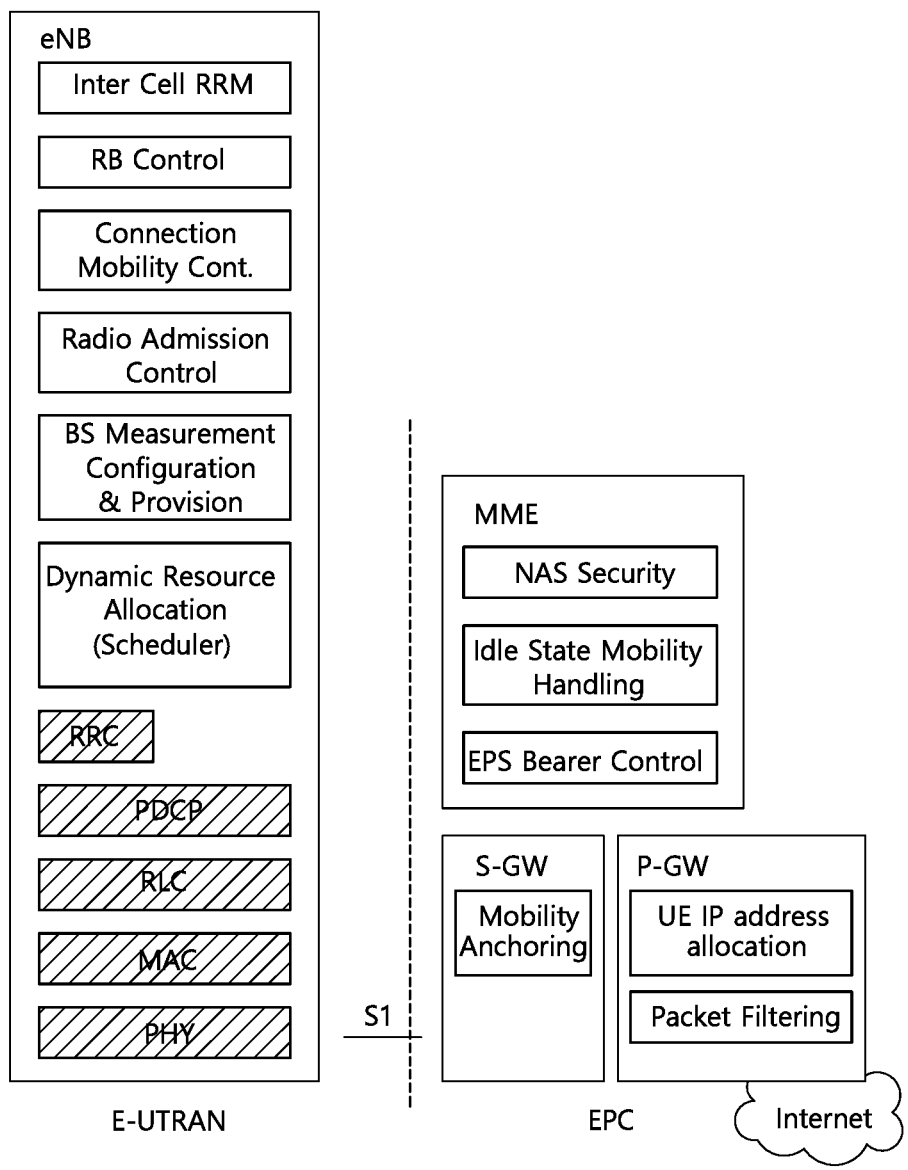
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
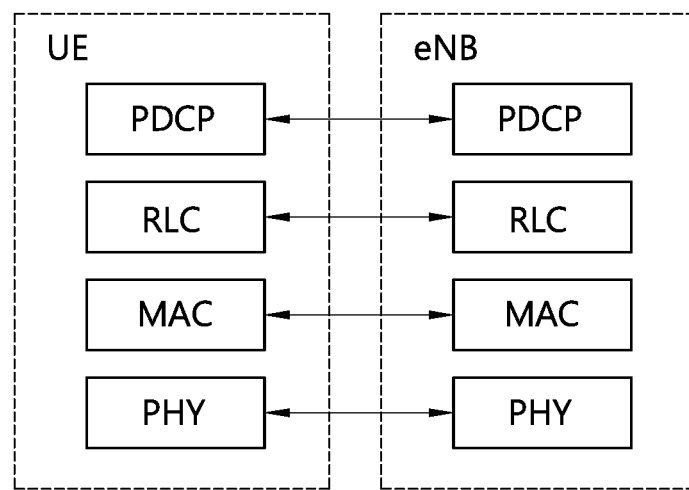
FIG. 3 shows a block diagram of a user plane protocol stack of an LTE system.
Figure 4:
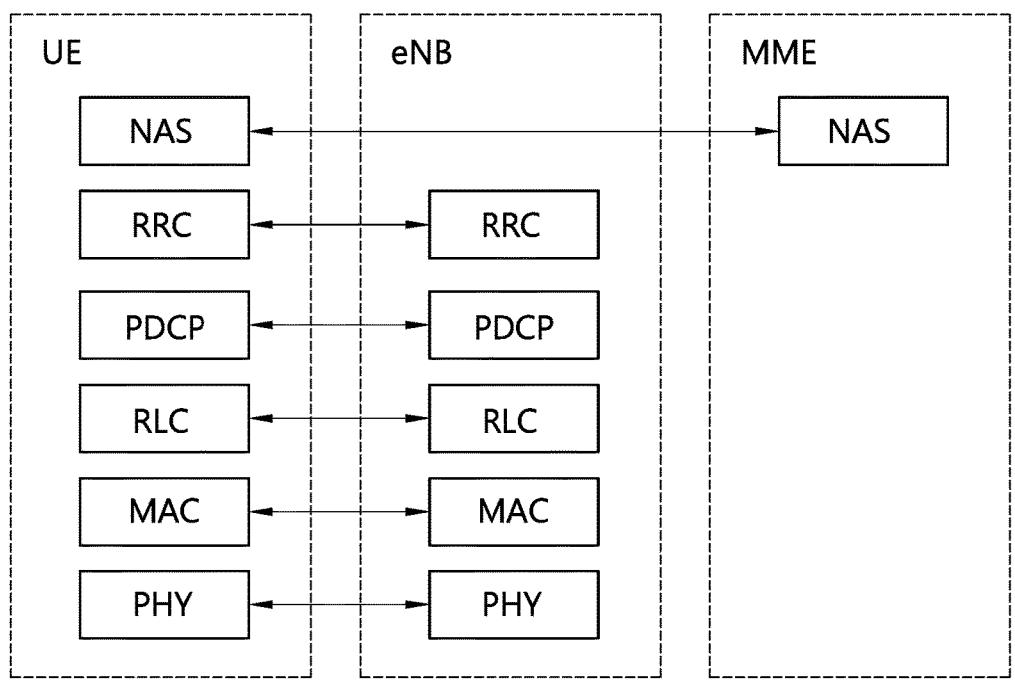
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
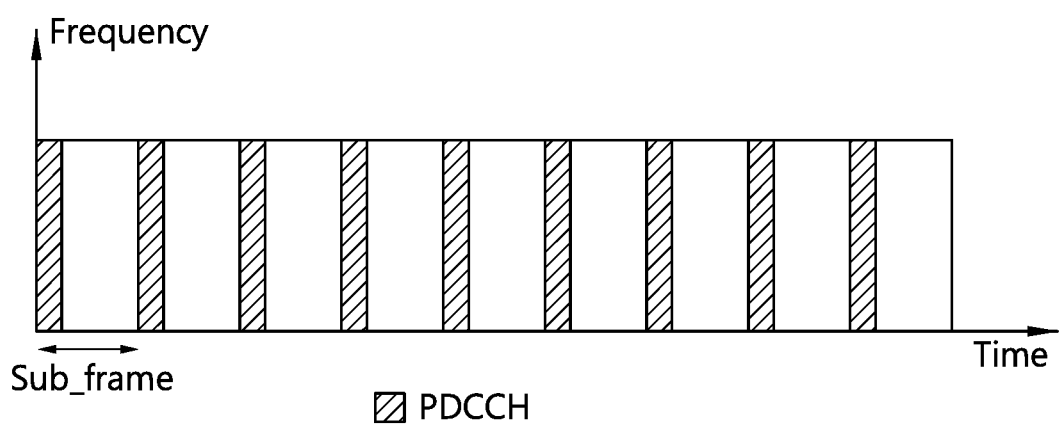
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, an uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. "ProSe" may be used mixed with "D2D". ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity ProSe UE identity (ID) is a unique identity allocated by evolved packet system (EPS) which identifies the ProSe enabled UE. ProSe application ID is an identity identifying application related information for the ProSe enabled UE.

Sidelink (SL) is UE to UE interface for ProSe direct communication and ProSe direct discovery. Sidelink comprises ProSe direct discovery and ProSe direct communication between UEs. Sidelink uses UL resources and physical channel structure similar to UL transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

For mapping between sidelink transport channels and sidelink physical channels, a sidelink discovery channel (SL-DCH) may be mapped to a physical sidelink discovery channel (PSDCH), which carries ProSe direct discovery message from the UE. The SL-DCH is characterized by:
 fixed size, pre-defined format periodic broadcast transmission;
 support for both UE autonomous resource selection and scheduled resource allocation by eNB;
 collision risk due to support of UE autonomous resource selection; no collision when UE is allocated dedicated resources by the eNB.

Further, a sidelink shared channel (SL-SCH) may be mapped to a physical sidelink shared channel (PSSCH), which carries data from a UE for ProSe direct communication. The SL-SCH is characterized by:
 support for broadcast transmission;
 support for both UE autonomous resource selection and scheduled resource allocation by eNB;
 collision risk due to support of UE autonomous resource selection; no collision when UE is allocated dedicated resources by the eNB;
 support for HARQ combining, but no support for HARQ feedback;
 support for dynamic link adaptation by varying the transmit power, modulation and coding.

Further, a sidelink broadcast channel (SL-BCH) may be mapped to a physical sidelink broadcast channel (PSBCH), which carries system and synchronization related information transmitted from the UE. The SL-BCH is characterized by pre-defined transport format.

A physical sidelink control channel (PSCCH) carries control from a UE for ProSe direct communication. The PSCCH is mapped to the sidelink control resources. The PSCCH indicates resource and other transmission parameters used by a UE for PSSCH.

For mapping between sidelink logical channels and sidelink transport channels for ProSe direct communication, a sidelink broadcast control channel (SBCCH) may be mapped to the SL-BCH. The SBCCH is a sidelink channel for broadcasting sidelink system information from one UE to other UE(s). This channel is used only by ProSe direct communication capable UEs. Further, a sidelink traffic channel (STCH) may be mapped to the SL-SCH. The STCH is a point-to-multipoint channel, for transfer of user information from one UE to other UEs. This channel is used only by ProSe direct communication capable UEs.

ProSe direct communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform ProSe direct communication.

For ProSe direct communication, the UE supporting ProSe direct communication can operate in two modes for resource allocation, which include Mode 1 (scheduled resource allocation) and Mode 2 (UE autonomous resource selection). In Mode 1, the UE needs to be RRC_CONNECTED in order to transmit data. The UE requests transmission resources from the eNB. The eNB schedules transmission resources for transmission of sidelink control and data. The UE sends a scheduling request (dedicated scheduling request (D-SR) or random access) to the eNB followed by a ProSe buffer status report (BSR). Based on the ProSe BSR, the eNB can determine that the UE has data for a ProSe direct communication transmission and estimate the resources needed for transmission. The eNB can schedule transmission resources for ProSe direct communication using configured sidelink radio network temporary identifier (SL-RNTI). In Mode 2, a UE on its own selects resources from resource pools and performs transport format selection to transmit sidelink control and data.

ProSe direct discovery is defined as the procedure used by the UE supporting ProSe direct discovery to discover other UE(s) in its proximity, using E-UTRA direct radio signals via PC5. ProSe direct discovery is supported only when the UE is served by E-UTRAN. Upper layer handles authorization for announcement and monitoring of discovery message. Content of discovery message is transparent to AS and no distinction in AS is made for ProSe direct discovery models and types of ProSe direct discovery. The ProSe protocol ensures that only valid discovery messages are delivered to AS for announcement.

There are two types of resource allocation for discovery message announcement, which include Type 1 (UE autonomous resource selection) and Type 2 (scheduled resource allocation). Type 1 is a resource allocation procedure where resources for announcing of discovery message are allocated on a non UE specific basis. In Type 1, the eNB provides the UE(s) with the resource pool configuration used for announcing of discovery message. The configuration may be signaled in broadcast or dedicated signaling. The UE autonomously selects radio resource(s) from the indicated resource pool and announce discovery message. The UE can announce discovery message on a randomly selected discovery resource during each discovery period. Type 2 is a resource allocation procedure where resources for announcing of discovery message are allocated on per UE specific basis. In Type 2, the UE in RRC_CONNECTED may request resource(s) for announcing of discovery message from the eNB via RRC. The eNB assigns resource(s) via RRC. The resources are allocated within the resource pool that is configured in UEs for monitoring.

In an LTE system, there are multiple components contributing to the total end to end delay for connected UEs. The limitations in performance are in general use case dependent, for which, e.g. UL latency may influence the DL application performance and vice versa. Examples of sources to latency are listed below.

(1) Grant acquisition: A UE with data to send must send a scheduling request (SR) and receive a scheduling grant before transmitting the data packet. In order to send a SR, it must wait for a SR-valid PUCCH resource and a corresponding scheduling grant transmitted to the UE in response. When the grant is decoded the data transmission can start over PUSCH.

(2) Random access: If the UL timing of a UE is not aligned, initial time alignment is acquired with the random access procedure. The time alignment can be maintained with timing advance commands from the eNB to the UE. However, it may be desirable to stop the maintenance of UL time alignment after a period of inactivity, thus the duration of the random access procedure may contribute to the overall latency in RRC_CONNECTED. The random access procedure also serves as an UL grant acquisition mechanism (random access based scheduling request). Therefore, for cases where random access is needed, no separate PUCCH based SR procedure/step is needed.

(3) Transmission time interval (TTI): The transmission of a request, grant, or data is done in subframe chunks with a fixed duration (1 ms), which is the source of a delay per packet exchange between the UE and the eNB.

(4) Processing: Data and control need to be processed (e.g. encoded and decoded) in the UE and eNB. Data processing is a source of processing delays, which are proportional to the transport block (TB) size. The processing of control information is typically less dependent on TB size.

(5) HARQ round trip time (RTT): For UL transmission in frequency division duplex (FDD), the HARQ acknowledgement (ACKK) for a packet received by the eNB in subframe n is reported in subframe n+4. If a retransmission is needed by the UE, this is done in subframe n+8. Thus, the HARQ RTT is 8 ms for FDD UL. For time division duplex (TDD), RTT depends on TDD configuration. The RTT for DL transmissions is not specified in detail, as the HARQ scheme is asynchronous. The HARQ feedback is available at subframe n+4 in FDD, and retransmissions can typically be scheduled in subframe n+8 or later if needed.

(6) Core/Internet: In the core network, packets can be queued due to congestion and delayed due to transmission over backhaul links. Internet connections can be congested and therefore add to the experienced end-to-end packet delay. EPC and/or Internet delays vary widely. In the context of latency reductions, it is reasonable to assume that latency performance of the transport links is good.

For example, Table 1 shows a typical radio access latency components for a UL transmission from a UE without a valid UL grant.

TABLE 1

| Component | Description | Time (ms) |
|---|---|---|
| 1 | Average waiting time for PUCCH (10 ms SR period/1 ms SR period) | 5/0.5 |
| 2 | UE sends SR on PUCCH | 1 |
| 3 | eNB decodes SR and generates the scheduling grant | 3 |
| 4 | Transmission of scheduling grant | 1 |
| 5 | UE processing delay (decoding of scheduling grant + L1 encoding of UL data) | 3 |
| 6 | Transmission of UL data | 1 |
| 7 | Data decoding in eNB | 3 |
| | Total delay (ms) | 17/12.5 |

Referring to Table 1, assuming Rel-8 functionality, the average waiting time for a PUCCH at a periodicity of 10 ms is 5 ms, leading to a radio access latency sum of 17 ms. With a SR period set to 1 ms, the average waiting time is reduced to 0.5 ms, which would lead to a sum of 12.5 ms.

Table 2 shows a typical radio access latency components for a DL transmission.

TABLE 2

| Component | Description | Time (ms) |
|---|---|---|
| 1 | Processing incoming data | 3 |
| 2 | TTI alignment | 0.5 |
| 3 | Transmission of DL data | 1 |
| 4 | Data decoding in UE | 3 |
| | Total delay (ms) | 7.5 |

From the tables, it can be seen that grant acquisition delay, transmission and data processing times are additive.

Existing means to limit latency may include short SR period, pre-scheduling of scheduling grants, semi-persistent scheduling (SPS), etc. However, each of these existing means to limit latency may have drawbacks. With a short SR period, e.g. 1 ms, the control plane overhead is increased which may reduce resource efficiency as more PUCCH resources in the cell to support the same number of users is needed. In addition, PUCCH resources are assigned and reconfigured with dedicated RRC signaling. Pre-scheduling of scheduling grants uses PDCCH resources, and the granted PUSCH resources cannot be used by other UEs, which may limit the radio resource utilization. Further, the UE is expected to send a zero padded transmission also if the buffer of the scheduled UE is empty. With SPS, periodic UL/DL resources can currently not be configured more frequently than every 10 subframes. Also with UL SPS, the UE is expected to send zero padded transmissions that may come with associated inefficient UE battery performance and increased UL interference.

In order to reduce latency in UL data transmission, two approaches have been considered in 3GPP, one of which is contention based SR (CB-SR) transmission, and the other is contention based PUSCH (CB-PUSCH) transmission. The CB-SR transmission enables more frequent transmission of SR by configuring SR with shorter SR period. Hence, the UE can inform the eNB of need for UL grant as soon as possible if SR is successfully transmitted. However, the SR may be subject to contention, and accordingly, the SR may fail due to collision with another SR that can be transmitted by another UE at the same time.

The CB-PUSCH transmission allows the UE to transmit UL data by using the pre-configured UL grants which can be shared by multiple UEs. This of course enables the UE to transmit UL data as soon as the UL data becomes available for transmission. In the pre-scheduling scheme allowed by current specifications, the eNB will assign one separate UL grant for each UE in each pre-scheduling interval, and the assigned UL grant will be wasted if one UE has no available data to transmit during one pre-scheduling interval. For CB-PUSCH transmission, multiple UEs may share the same PUSCH resource (either dynamically granted or configured). Collision will happen if two or more UEs that share the same PUSCH resource perform the PUSCH transmission at the same time, and in this case the eNB may not be able to successfully decode all of the PUSCH transmissions. The CB-PUSCH transmission allows more efficient PUSCH resource utilization compared to the existing pre-scheduling scheme. However, as a result of collision, the potential retransmissions can result in increased latency for colliding UEs.

As described above, the CB-PUSCH transmission requires additional contention resolution methods in case the contention occurs. Therefore, in this approach, for contention resolution, the UE may transmit SR along with PUSCH so that the eNB can provide another UL grant to the UE which fails at PUSCH transmission on the shared PUSCH resource. This means that when the contention occurs and the UE fails at PUSCH transmission on the shared PUSCH resource, the UE may fall back to the legacy operation and perform the sequential procedures of getting UL grant as legacy.

The eNB may schedule SL resources based on SL BSR received from the UE which wants to perform ProSe communication. The eNB may also allocate SL resources based on request from the UE which want to perform ProSe discovery. Such ProSe communication/discovery transmissions according to the prior art may require some latency when the eNB schedules SL transmissions. Some services such as vehicular communication may require very short latency on PC5 interface, i.e. between devices. However, the prior art may not support such short latency in some cases.

In order to solve the problem described above, a method for performing SL transmission based on CB-SR according to an embodiment of the present invention is proposed. According to an embodiment of the present invention, the UE may use CB-SR resources to request SL transmission resources. In this case, different sets of the CB-SR resources may be configured to request UL transmission resources and SL transmission resources. According to another embodiment of the present invention, when the UE transmits CB-SR to the eNB to request SL transmission resources, the UE may start a timer. If the UE does not receive SL grant until the timer expires, the UE may transmit non-contention based SR to the eNB or autonomously select SL resources from resource pool to perform SL transmission.

Figure 6:
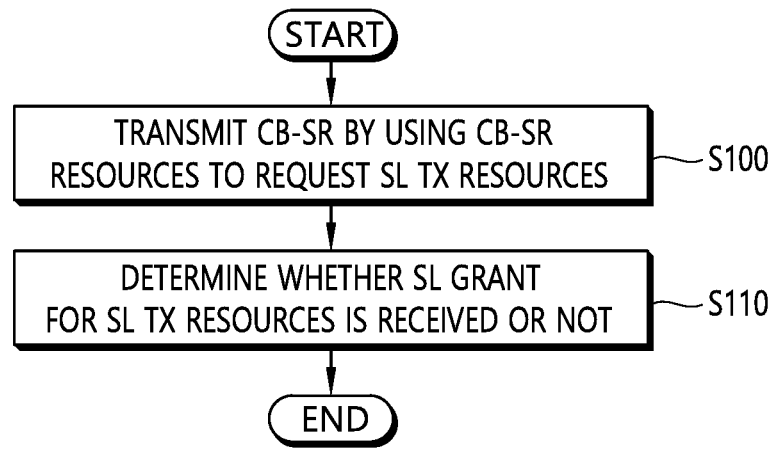
FIG. 6 shows a method for performing, a UE, SL transmission according to an embodiment of the present invention.

FIG. 6 shows a method for performing, a UE, SL transmission according to an embodiment of the present invention.

In step S100, the UE transmits a CB-SR to the eNB by using CB-SR resources to request SL transmission resources. Different sets of the CB-SR resources may be configured to request UL transmission resources and SL transmission resources. That is, the CB-SR resources to request SL transmission resources may correspond to a first set of CB-SR resources, and the first set of CB-SR resources may be configured separately from a second set of CB-SR resources which is used to request UL transmission resources.

Upon transmitting the CB-SR to the eNB, the eNB may start a timer. In step S110, the UE determines whether a SL grant for the SL transmission resources is received or not until the timer expires. If it is determined that the SL grant for the SL transmission resources is not received until the timer expires, the UE may transmit a non-contention based SR to the eNB. The non-contention based SR may be dedicated to SL transmission or common to both SL transmission and UL transmission. Alternatively, if it is determined that the SL grant for the SL transmission resources is not received until the timer expires, the UE may perform a random access procedure in order to request the SL grant or a UL grant. Alternatively, if it is determined that the SL grant for the SL transmission resources is not received until the timer expires, the UE may autonomously select SL resources from resource pools configured for UE autonomous transmission (i.e. Mode 2 for ProSe direct communication or Type 1 for ProSe direct discovery). If it is determined that the SL grant for the SL transmission resources is received before the timer expires, the UE may perform a SL transmission to another UE by using the SL grant.

Figure 7:
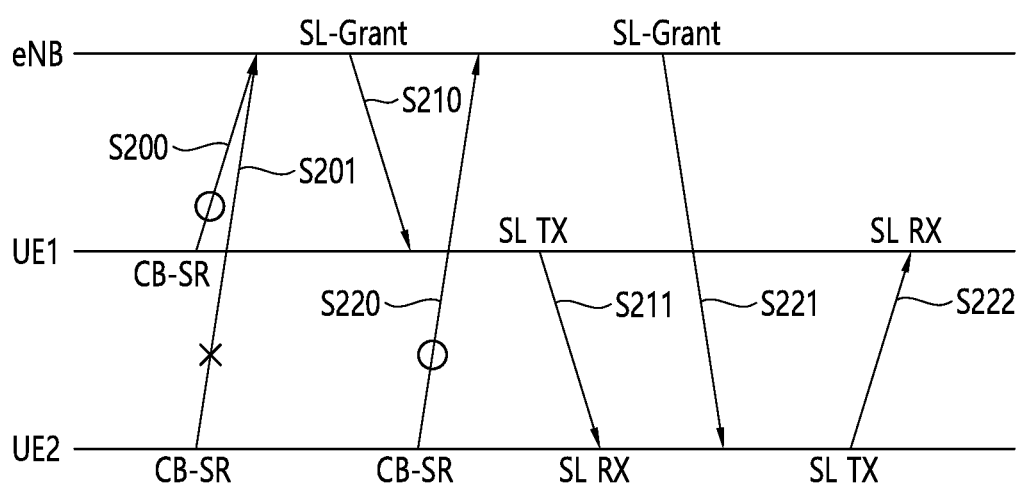
FIG. 7 shows an example of eNB scheduled SL transmission based on CB-SR according to an embodiment of the present invention.

FIG. 7 shows an example of eNB scheduled SL transmission based on CB-SR according to an embodiment of the present invention.

The eNB informs UE1 and UE2 of CB-SR resources and contention based SL-RNTI (CB-SL-RNTI), which is a kind of SL-RNTI associated with CB-SR. The eNB may provide UEs with different sets of the CB-SR resources for UL transmissions and SL transmissions. The eNB may also inform UEs of timer value.

When data becomes available for SL transmission, UEs may transmit CB-SR to the eNB by using CB-SR resources possibly specific to SL transmission. Specifically, in step S200 and step S201, UE1 and UE2 transmit CB-SR by using CB-SR resources respectively. Further, UEs may start a timer when UEs transmit CB-SR.

UE1 and UE2 may transmit CB-SR at the same time by using the same CB-SR resources, which may cause collision in transmissions of CB-SR. In this embodiment, it is assumed that the CB-SR transmitted by UE1 is successfully transmitted to the eNB while the CB-SR transmitted by UE2 is not successfully transmitted to the eNB.

Since the eNB successfully receives the CB-SR transmitted by UE1, in step S210, the eNB transmits the SL grant to UE1. The SL grant may be transmitted on PDCCH addressed by CB-SL-RNTI or SL-RNTI. If UE1 receives the SL grant before the timer expires, in step S211, UE1 may perform SL transmission to UE2 by using the SL grant.

If UE2 does not receive the SL grant until the timer expires, in step S220, UE2 may perform retransmission of CB-SR, e.g. by reselecting CB-SR resource. UE2 may successfully transmit CB-SR to the eNB, and then, in step S221, UE2 may receive SL grant. Finally, in step S222, UE2 may perform SL transmission to UE1 by using the SL grant.

Figure 8:
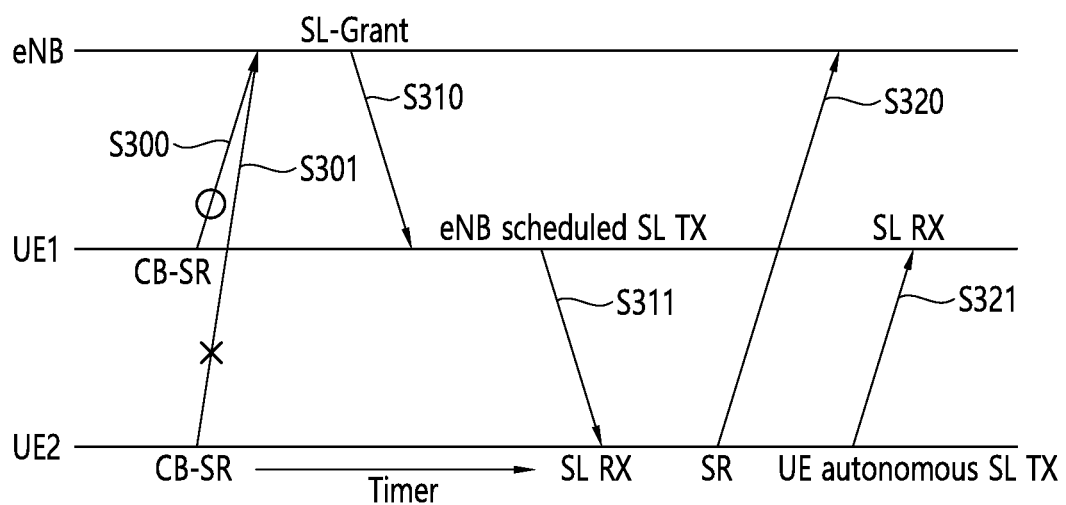
FIG. 8 shows an example of fallback to non-contention based SR or UE autonomous SL transmission after CB-SR transmission according to an embodiment of the present invention.

FIG. 8 shows an example of fallback to non-contention based SR or UE autonomous SL transmission after CB-SR transmission according to an embodiment of the present invention.

The eNB informs UE1 and UE2 of CB-SR resources and CB-SL-RNTI. The eNB may provide UEs with different sets of the CB-SR resources for UL transmissions and SL transmissions. The eNB may also inform UEs of timer value.

When data becomes available for SL transmission, UEs may transmit CB-SR to the eNB by using CB-SR resources possibly specific to SL transmission. Specifically, in step S300 and step S301, UE1 and UE2 transmit CB-SR by using CB-SR resources respectively. Further, UEs may start a timer when UEs transmit CB-SR.

UE1 and UE2 may transmit CB-SR at the same time by using the same CB-SR resources, which may cause collision in transmissions of CB-SR. In this embodiment, it is assumed that the CB-SR transmitted by UE1 is successfully transmitted to the eNB while the CB-SR transmitted by UE2 is not successfully transmitted to the eNB.

Since the eNB successfully receives the CB-SR transmitted by UE1, in step S310, the eNB transmits the SL grant to UE1. The SL grant may be transmitted on PDCCH addressed by CB-SL-RNTI or SL-RNTI. If UE1 receives the SL grant before the timer expires, in step S311, UE1 may perform SL transmission to UE2 by using the SL grant.

If UE2 does not receive the SL grant until the timer expires, in step S320, UE2 may transmit non-contention based SR on PUCCH or perform random access procedure in order to request SL grant or UL grant. The non-contention based SR transmitted on PUCCH may be dedicated to SL transmission or may be common to both SL and UL transmissions. Then, UE2 may receive SL grant from the eNB so that UE2 may perform SL transmission scheduled by the eNB. Or, UE2 may receive UL grant from the eNB so that UE2 may perform UL transmission scheduled by the eNB.

Alternatively, if UE2 does not receive the SL grant until the timer expires, in step S321, UE2 may autonomously select SL resource from resource pools configured for UE autonomous transmission (i.e. Mode 2 for ProSe direct communication or Type 1 for ProSe direct discovery). Then, UE2 may perform SL transmission based on the autonomously selected SL resource.

Figure 9:
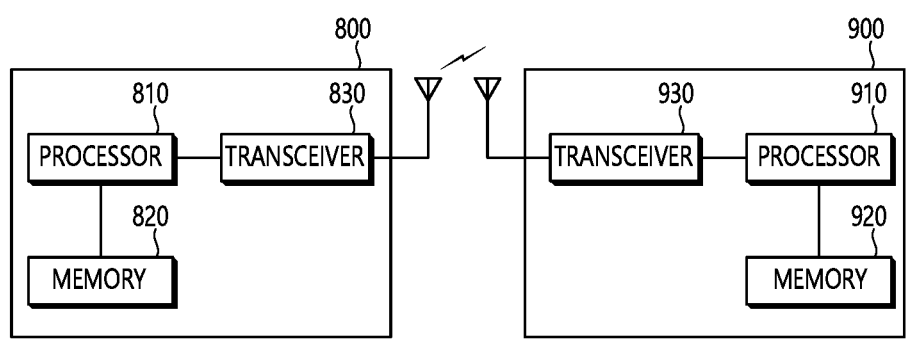
FIG. 9 shows a wireless communication system to implement an embodiment of the present invention.

FIG. 9 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. That is, the processor 910 may control the transceiver 930 to transmit a CB-SR to the eNB 800 by using CB-SR resources to request SL transmission resources, and determine whether a SL grant for the SL transmission resources is received or not. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a user equipment (UE) in a wireless communication system, the method comprising:
    transmitting a contention based scheduling request (CB-SR) to an eNodeB (eNB) using CB-SR resources to request sidelink (SL) transmission resources;
    starting a timer upon transmitting the CB-SR to the eNB; and
    transmitting a non-contention based SR to the eNB, when a SL grant for the SL transmission resources is not received until the timer expires,
    wherein the non-contention based SR is dedicated to a SL transmission or common to both a SL transmission and an UL transmission,
    wherein the CB-SR resources for requesting SL transmission resources correspond to a first set of CB-SR resources, and
    wherein the first set of CB-SR resources is configured separately from a second set of CB-SR resources for requesting uplink (UL) transmission resources.

2. The method of claim 1, further comprising:
    performing a random access procedure in order to request the SL grant or an UL grant, when it is determined that the SL grant for the SL transmission resources is not received until the timer expires.

3. The method of claim 1, further comprising:
    autonomously selecting SL resources from resource pools configured for UE autonomous transmission, when it is determined that the SL grant for the SL transmission resources is not received until the timer expires.

4. The method of claim 1, further comprising:
performing a SL transmission to another UE using the SL grant, when it is determined that the SL grant for the SL transmission resources is received before the timer expires.

5. A user equipment (UE) in a wireless communication system, the UE comprising:
a memory;
a transceiver; and
a processor coupled to the memory and the transceiver, wherein the processor is configured to:
control the transceiver to transmit a contention based scheduling request (CB-SR) to an eNodeB (eNB) using CB-SR resources to request sidelink (SL) transmission resources,
start a timer upon the transceiver transmitting the CB-SR to the eNB, and
control the transceiver to transmit a non-contention based SR to the eNB, when a SL grant for the SL transmission resources is not received until the timer expires,
wherein the non-contention based SR is dedicated to a SL transmission or common to both a SL transmission and an UL transmission,
wherein the CB-SR resources for requesting SL transmission resources correspond to a first set of CB-SR resources, and
wherein the first set of CB-SR resources is configured separately from a second set of CB-SR resources for requesting uplink (UL) transmission resources.

6. The UE of claim 5, wherein the processor is further configured to autonomously select SL resources from resource pools configured for UE autonomous transmission, when it is determined that the SL grant for the SL transmission resources is not received until the timer expires.

* * * * *